United States Patent [19]

Müller et al.

[11] Patent Number: 5,006,099

[45] Date of Patent: Apr. 9, 1991

[54] FOUR WHEEL DRIVE FOR A MOTOR VEHICLE

[75] Inventors: Robert Müller, Moensheim; Gerhard Weller, Maulbronn, both of Fed. Rep. of Germany

[73] Assignee: Dr. Ing. h.c.F. Porsche AG, Fed. Rep. of Germany

[21] Appl. No.: 421,326

[22] Filed: Oct. 13, 1989

[30] Foreign Application Priority Data

Oct. 15, 1988 [DE] Fed. Rep. of Germany ....... 3835224

[51] Int. Cl.$^5$ ............................................. F16H 47/04
[52] U.S. Cl. ................................... 475/86; 475/249
[58] Field of Search ............... 475/248, 249, 250, 253, 475/220, 6, 84, 86, 160; 180/248, 249

[56] References Cited

U.S. PATENT DOCUMENTS

| | | | |
|---|---|---|---|
| 3,323,389 | 6/1967 | Hause | 475/84 |
| 3,605,963 | 9/1971 | Resb et al. | 192/18 A |
| 3,899,938 | 8/1975 | Crabb | 74/710.5 |
| 4,718,303 | 1/1988 | Fogelberg | 74/710.5 |
| 4,754,836 | 7/1988 | Harada et al. | 475/86 |

FOREIGN PATENT DOCUMENTS

| | | |
|---|---|---|
| 0230561 | 1/1986 | European Pat. Off. . |
| 0216318 | 4/1987 | European Pat. Off. . |
| 0274167 | 7/1988 | European Pat. Off. . |
| 3212495 | 8/1985 | Fed. Rep. of Germany . |
| 2609137 | 12/1986 | France . |
| 0251648 | 10/1988 | Japan ................................... 475/248 |
| 2186040 | 8/1987 | United Kingdom .................. 475/89 |

*Primary Examiner*—Rodney H. Bonck
*Assistant Examiner*—Ryan Massey
*Attorney, Agent, or Firm*—Evenson, Wands, Edwards, Lenahan & McKeown

[57] ABSTRACT

In order to construct a four wheel drive of a motor vehicle as a compact constructional unit with a low space requirement, the two output shafts of the rotating four wheel locking system are disposed in one another. A cylindrical lock housing encloses the locking system including a planet gear transfer transmission and a disk bundle at a narrow axial and radial distance.

17 Claims, 3 Drawing Sheets

FOUR WHEEL DRIVE FOR A MOTOR VEHICLE

BACKGROUND AND SUMMARY OF THE INVENTION

The present invention relates generally to a four wheel drive for a motor vehicle and more particularly to an arrangement which is spatially more compact.

Reference is made to German Patent Application No. P 38 35 223.0 filed in Germany on Oct. 13, 1989, a corresponding U.S. application Ser. No. 07/421,327 being filed in the U.S. on even date therewith.

A four wheel drive arrangement is described in German Patent Specification (DE-PS) 32 12 495 in which a planet gear transfer transmission is driven by a gear shift transmission by way of an input shaft. An output shaft to a rear axle, which is driven continuously, is disposed coaxially to the input shaft. When a clutch is engaged, a disk brake is operated which acts upon the transfer transmission, and a second output shaft is connected which is disposed in parallel to the input shaft. A chain drive is used for the transmitting of motion to the second output shaft.

From European Patent Application (EP-A) 0 216 318, a four wheel drive is disclosed having a locking system including a planetary transmission and a bundle of disks which can be pressed against its planet carrier in a frictionally engaged manner. A first output shaft of the locking system, which is constructed as a hollow shaft, is disposed concentrically with respect to an input shaft. A second output shaft is disposed coaxially to it. The input shaft and the two output shafts are disposed in bearings of a stationary housing.

Accordingly, it is an object of the present invention to provide a four wheel drive of this type in a spatially more compact manner.

If the input shaft is constructed as a hollow shaft, and the first output shaft is disposed at it, and the second output shaft is disposed in the first output shaft, a four wheel drive, according to advantageous features of preferred embodiments of the present invention, can be housed in a very narrow space since bearings for the input shaft and the output shafts, which are fixed at the housing, are not absolutely necessary. By means of the appropriate dimensioning of the planet gear transfer transmission and of the disk brake, both components may have approximately the same outside diameter and with a narrow radial and axial play, may be surrounded by a cylindrical lock housing. The flux of force moves from the input shaft to the lock housing and to the planet carrier which is non-rotatable with respect to it. The planet gears disposed at the planet carrier, on one side, are engaged with the ring gear which is non-rotatable with respect to the first output shaft and, on the other side, are engaged with the sun gear which is non-rotatable on the second output shaft.

According to the selection of the gearings at the planetary transmission, a torque distribution takes place to the two output shafts of the four wheel locking system leading to the rear axle and to the front axle. A torque distribution of about 31/69 (front/rear) has proven to be particularly advantageous. After a given slip difference was reached, by means of the operating of the disk brake, the drive torque is redistributed from the axle with the higher slip to the other axle.

Other characteristics developing embodiments of the invention, which concern the bearing and the guiding of oil in the four wheel locking system, are also envisioned.

Other objects, advantages and novel features of the present invention will become apparent from the following detailed description of the invention when considered in conjunction with the accompanying drawings.

DETAILED DESCRIPTION OF THE DRAWINGS

Figure 1:
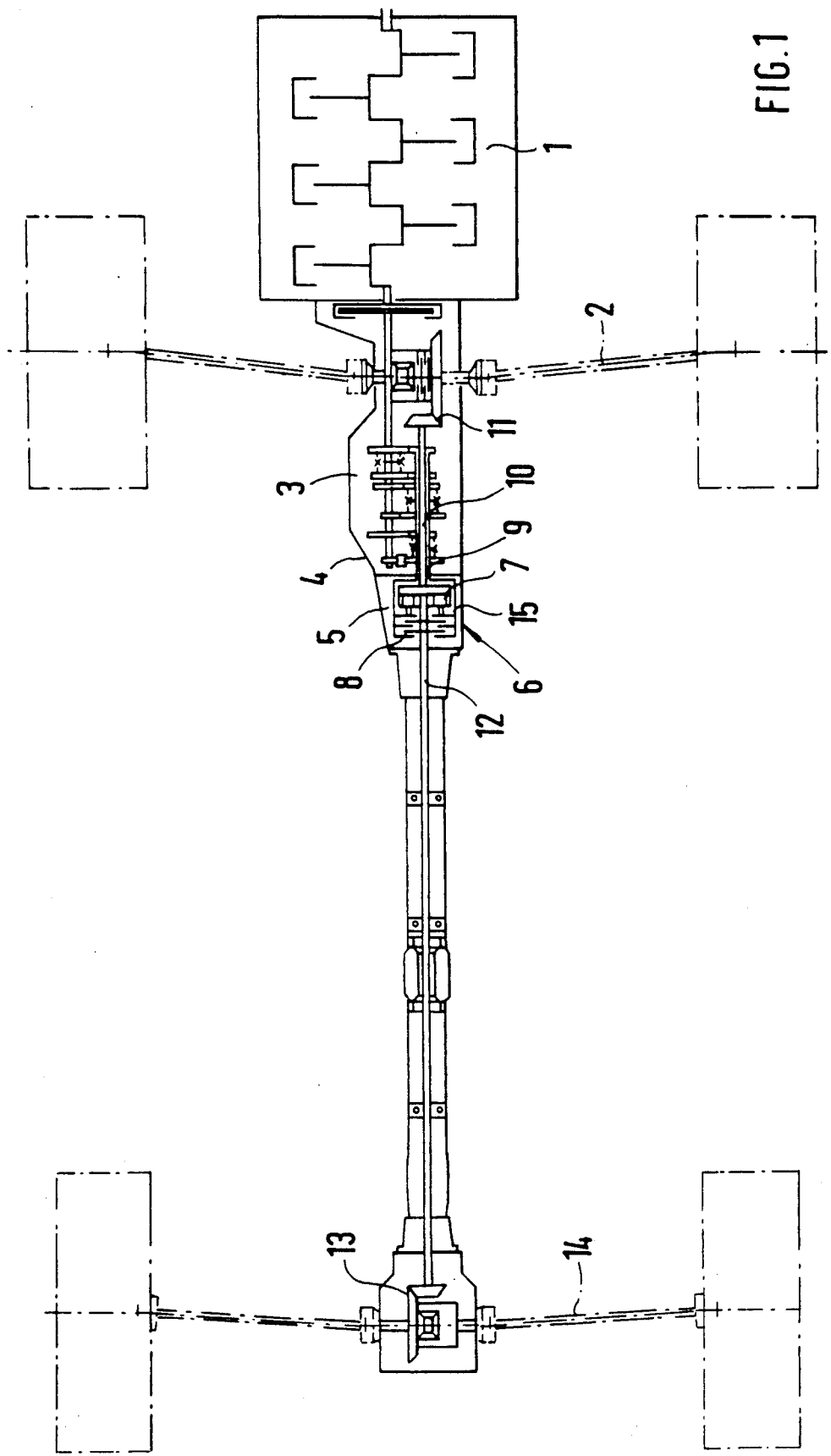
FIG. 1 is a schematic representation of a four wheel drive of a motor vehicle.

As shown in FIG. 1, an internal combustion engine 1 is arranged at the rear end of a motor vehicle and drives a gear shift transmission 3 disposed at the area of the rear axle 2, a transmission housing 4 of this gear shift transmission 3 being flanged to the engine section. In a housing cover 5 which is attached, for example by screws, to the transmission housing 4, a four wheel locking system 6 is housed which includes a planet gear transfer transmission 7 and a disk bundle 8.

An output shaft of the gear shift transmission 2, constructed as a hollow shaft, is used as the input shaft 9 of the locking system 6. A first output shaft 10, which passes through the hollow shaft concentrically, leads away from the locking system 6 and leads to a bevel gear, ring gear angle drive 11 of the rear axle 2. A second output shaft 12 drives a bevel gear, ring gear angle drive 13 of the front axle 14.

Figure 2:
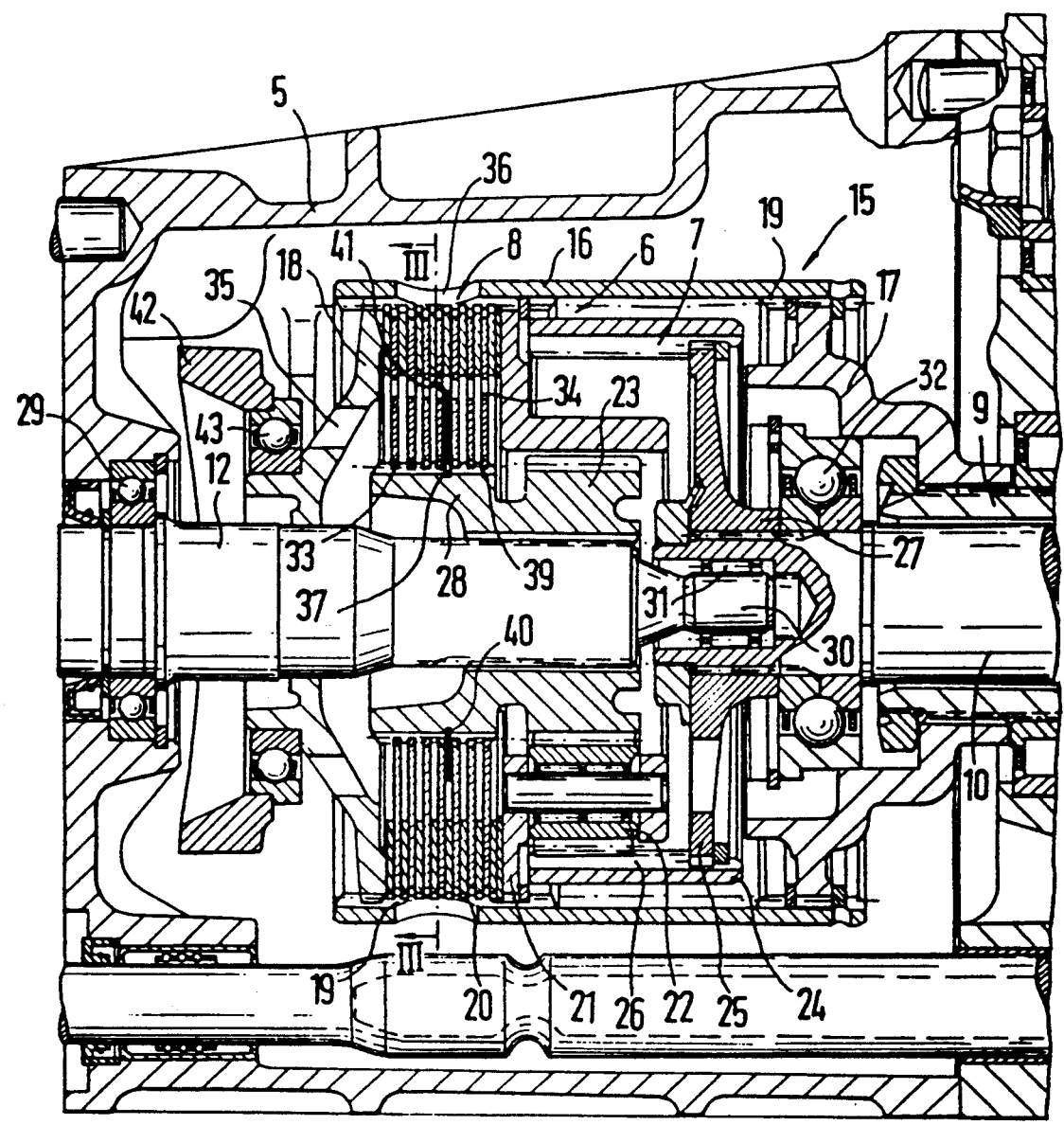
FIG. 2 is a longitudinal sectional view of a four wheel locking system in accordance with one embodiment of the present invention.

As best seen in FIG. 2, the planet gear transfer transmission 7 and the disk bundle 8 are narrowly surrounded by a lock housing 15. The housing 15 includes a cylindrical shell part 16 which is smooth on the exterior, a bearing cap 17 which is fastened in the shell part 16, and a pressure plate 18 which is non-rotatable and longitudinally movable at its other side. The bearing cap 17 and the pressure plate 18 engage in an internal toothing 19 of the shell part 16, in which external disks 20 and a planet carrier 21 are also held in a non-rotatable manner.

Since the bearing cap 17 is fixed on the hollow input shaft 9, its rotating motion, by means of the lock housing 15, is transmitted to the planet carrier 21, and by means of the planet gears 22 rotating along with it, is transmitted to a sun gear 23 and to a ring gear 24. The ring gear 24 is in rotating connection with the first output shaft 10 leading to the rear axle 2 by way of a clutch plate 25 which, with its outer edge, is held in the toothing 26 of the ring gear 24 and, with its hub 27, is fastened on a serration of the first output shaft 10.

The sun gear 23 is constructed, for example, as a one piece component with a clutch shell 28 carrying internal disks 33 and is non-rotatably held on a serration of the second output shaft 12 driving the front axle 14 of the motor vehicle. The second output shaft 12, on its one side, is disposed at a ball bearing 29 of the housing cover 5, and on its other side, by means of a centric journal 30, is disposed in a needle bearing 31 of the first output shaft 10. On an end side thereof, the first output shaft 10 is disposed in a four-point bearing 32 held in the bearing cap 17. By means of this four-point bearing 32, the axial forces originating from the angle drive 11 are supported with respect to the first output shaft 10. An axial shifting of the first output shaft 10 with respect to the input shaft 9 is prevented.

In order to ensure a sufficient oil lubrication of the disk bundle 8, all internal disks 33 and external disks 20 are provided with mutually aligned axial through bores 34. Since the pressure plate 18 also has several axial bores 35, lubricating oil can penetrate through the axial bores 35 and 34 into the disk bundle 8. The oil flow is promoted by radial breakthroughs 36 which are provided in the area of the disk bundle 8 in the shell part 16 and, when the lock housing 15 rotates, permit a radial oil discharge caused by centrifugal force into the housing cover 5.

Figure 3:
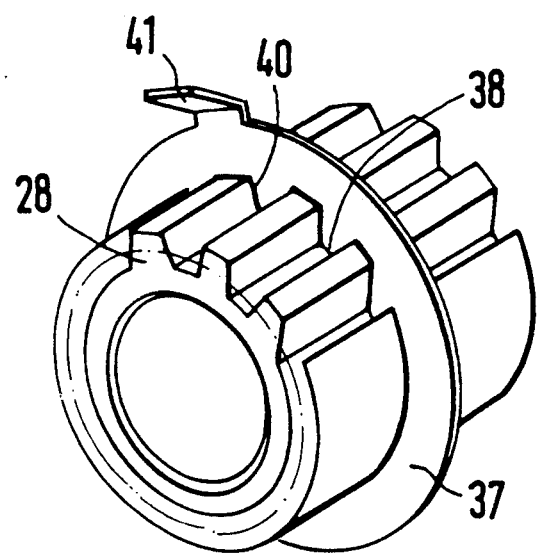
FIG. 3 is a cross-sectional view according to Line III—III of FIG. 2 providing a first view of mounting.
Figure 4:
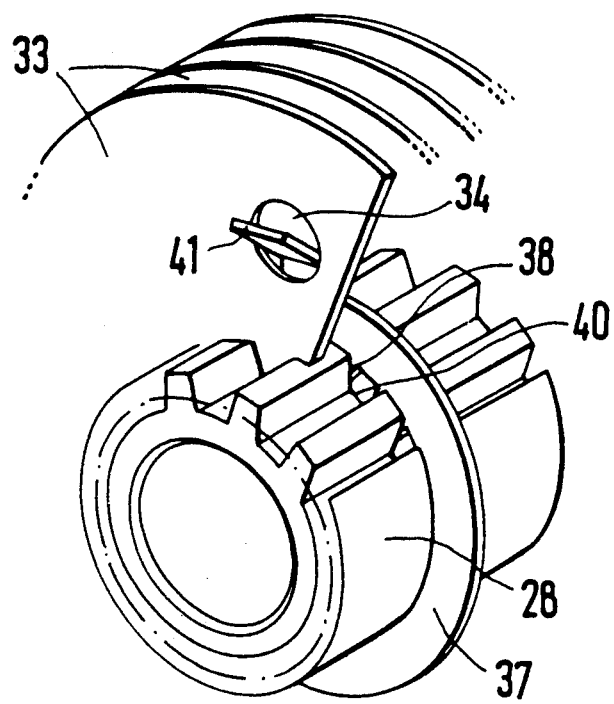
FIG. 4 is a cross-sectional view according to Line III—III of FIG. 2 providing a second view of mounting.

As best seen in FIGS. 3 and 4, a detent disk 37 is used for the axial fixing of the sun gear 23 and of the clutch shell 28 on the second output shaft 12. For the mounting, it is pushed through with its internal toothing 38 between an external toothing 39 of the clutch shell 28 to a ring groove 40, is then rotated in the ring groove 40 in such a manner that the teeth of the clutch disk 28 are flush with the teeth of the detent disk 37. In this position, its beaded outer edge 41 is hung into an axial bore 34 of a central disk.

The gearings in the planet gear transfer transmission 7 are selected such that a drive torque distribution front axle/rear axle of about 31/69 is obtained. When a certain slip difference is reached between the front axle 14 and the rear axle 2, the disk bundle 8 is compressed hydraulically by means of an engaging lever 42 and an engaging bearing 43 centered on the pressure plate 18 and is frictionally engaged with the planet carrier 21, so that the planet gear transfer transmission 7 is locked as a function of the slip. Thus the drive torque is redistributed from the axle with the higher slip to the other axle.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A four wheel drive for a motor vehicle having a locking system arranged in a rear axle/front axle drive line comprising:

a planet gear transfer transmission having a sun gear, planet gears disposed at a planet carrier and a ring gear, the planet carrier being non-rotatable with respect to an input shaft of the locking system, the ring gear being non-rotatably connected with a first output shaft which is concentric with respect to the input shaft, and the sun gear being non-rotatably connected with a second output shaft, wherein the input shaft is constructed as a hollow shaft, the first output shaft being rotatably disposed inside the hollow shaft, and the second shaft being supportably disposed in an opening n the first output shaft; and a bundle of disks which can be pressed against the planet carrier in a frictionally engaged manner by means of a pressure applying means to lock the gear transfer transmission in response to a predetermined slip difference between the first and second output shafts, said bundle of disks including internal disks and external disks, wherein the disk bundle and the planet gear transfer transmission are surrounded, with a slight radial and axial gap, by a cylindrical lock housing.

2. A four wheel drive according to claim 1, wherein the lock housing comprises:

a cylindrical shell part; and a bearing cap which is fastened to one side of the shell part and at the same time on the input shaft for bearing of the first output shaft;

wherein the pressure applying means includes a pressure plate which is disposed in the lock housing, is non-rotatable and can be pressed against the disk bundle by an engaging bearing and an engaging lever.

3. A four wheel drive according to claim 1, wherein the second output shaft, utilizing a centric end-face journal, is disposed in a needle bearing of the first output shaft at one side and at another side is disposed in a ball bearing of a housing cover which surrounds the lock housing and is flanged to a transmission housing.

4. A four wheel drive according to claim 3, wherein the internal disks and external disks have axial bores which are aligned with respect to one another and which permit an oil flow from an engaging bearing, through axial bores of a pressure plate, to the bundle of disks.

5. A four wheel drive according to claim 4, wherein radial breakthroughs are provided in the shell part of the lock housing in an area of the disk bundle.

6. A four wheel drive according to claim 3, wherein the sun gear and a clutch shell are non-rotatable side-by-side on the second output shaft for a non-rotatable movement of the internal disks.

7. A four wheel drive according to claim 6, wherein the clutch shell and the sun gear are constructed in one piece.

8. A four wheel drive according to claim 1, wherein the bearing cap contains an axially loadable roller bearing for bearing of the first output shaft.

9. A four wheel drive for a motor vehicle having a locking system arranged in a rear axle/front axle drive line comprising:

a planet gear transfer transmission having a sun gear, planet gears disposed at a planet carrier and a ring gear, the planet carrier being non-rotatable with respect to an input shaft of the locking system, the ring gear being non-rotatably connected with a first output shaft which is concentric with respect to the input shaft, and the sun gear being non-rotatably connected with a second output shaft, wherein the input shaft is constructed as a hollow shaft, the first output shaft being rotatably disposed inside the hollow shaft, and the second shaft being supportably disposed in an opening n the first output shaft; and a bundle of disks which can be pressed against the planet carrier in a frictionally engaged manner by means of a pressure applying means to lock the gear transfer transmission in response to a predetermined slip difference between the first and second output shafts, said bundle of disks including internal disks and external disks, wherein the ring gear is connected with the first output shaft by a front side clutch plate which is fastened to toothing thereof.

10. A four wheel drive for a motor vehicle having a locking system arranged in a rear axle/front axle drive line comprising:
- a planet gear transfer transmission having a sun gear, planet gears disposed at a planet carrier and a ring gear, the planet carrier being non-rotatable with respect to an input shaft of the locking system, the ring gear being non-rotatably connected with a first output shaft which is concentric with respect to the input shaft, and the sun gear being non-rotatably connected with a second output shaft, wherein the input shaft is constructed as a hollow shaft, the first output shaft being rotatably disposed inside the hollow shaft, and the second shaft being supportably disposed in an opening n the first output shaft; and
- a bundle of disks which can be pressed against the planet carrier in a frictionally engaged manner by means of a pressure applying means to lock the gear transfer transmission in response to a predetermined slip difference between the first and second output shafts, said bundle of disks including internal disks and external disks, wherein the internal disks and external disks have axial bores which are aligned with respect to one another and which permit an oil flow from an engaging bearing, through axial bores of a pressure plate, to the bundle of disks.

11. A four wheel drive for a motor vehicle having a locking system arranged in a rear axle/front axle drive line comprising:
- a planet gear transfer transmission having a sun gear, planet gears disposed at a planet carrier and a ring gear, the planet carrier being non-rotatable with respect to an input shaft of the locking system, the ring gear being non-rotatably connected with a first output shaft which is concentric with respect to the input shaft, and the sun gear being non-rotatably connected with a second output shaft, wherein the input shaft is constructed as a hollow shaft, the first output shaft being rotatably disposed inside the hollow shaft, and the second shaft being supportably disposed in an opening n the first output shaft; and
- a bundle of disks which can be pressed against the planet carrier in a frictionally engaged manner by means of a pressure applying means to lock the gear transfer transmission in response to a predetermined slip difference between the first and second output shafts, said bundle of disks including internal disks and external disks, wherein the sun gear and a clutch shell are non-rotatable side-by-side on the second output shaft for a non-rotatable movement of the internal disks.

12. A four wheel drive according to claim 11, wherein the clutch shell and the sun gear are constructed in one piece.

13. A four wheel drive according to claim 11, wherein a detent disk engages form-lockingly in an axial bore of a disk, this detent disk, at an inner circumference thereof, engaging in a ring groove of the clutch shell and axially fixing this clutch shell and the sun gear.

14. A four wheel drive according to claim 13, wherein the internal disks and external disks have axial bores which are aligned with one another and permit an oil flow from an engaging bearing, through axial bores of the pressure plate, to the bundle of disks.

15. A four wheel drive according to claim 13, wherein the sun gear and the clutch shell are non-rotatable side-by-side on the second output shaft for a non-rotatable movement of the internal disks.

16. A four wheel drive for a motor vehicle having a locking system arranged in a rear axle/front axle drive line comprising:
- a planet gear transfer transmission having a sun gear, planet gears disposed at a planet carrier and a ring gear, the planet carrier being non-rotatable with respect to an input shaft of the locking system, the ring gear being non-rotatably connected with a first output shaft which is concentric with respect to the input shaft, and the sun gear being non-rotatably connected with a second output shaft, wherein the input shaft is constructed as a hollow shaft, the first output shaft being rotatably disposed inside the hollow shaft, and the second shaft being supportably disposed in an opening n the first output shaft; and
- a bundle of disks which can be pressed against the planet carrier in a frictionally engaged manner by means of a pressure applying means to lock the gear transfer transmission in response to a predetermined slip difference between the first and second output shafts, said bundle of disks including internal disks and external disks, wherein there is a bearing cap which contains an axially loadable roller bearing for bearing of the first output shaft with respect to the input shaft.

17. A four wheel drive according to claim 16, wherein said axially loadable roller bearing is a four point bearing.

* * * * *